US012141451B2

(12) United States Patent
Chatterjee et al.

(10) Patent No.: US 12,141,451 B2
(45) Date of Patent: Nov. 12, 2024

(54) MEMORY PAGE ACCESS INSTRUMENTATION

(71) Applicant: NVIDIA Corporation, Santa Clara, CA (US)

(72) Inventors: Niladrish Chatterjee, Kirkland, WA (US); Zachary Joseph Susskind, Austin, TX (US); Donghyuk Lee, Cedar Park, TX (US); James Michael O'Connor, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 121 days.

(21) Appl. No.: 18/163,167

(22) Filed: Feb. 1, 2023

(65) Prior Publication Data
US 2024/0256153 A1    Aug. 1, 2024

(51) Int. Cl.
*G06F 12/00* (2006.01)
*G06F 3/06* (2006.01)

(52) U.S. Cl.
CPC .......... *G06F 3/0625* (2013.01); *G06F 3/0644* (2013.01); *G06F 3/0659* (2013.01); *G06F 3/0673* (2013.01)

(58) Field of Classification Search
CPC .... G06F 3/0625; G06F 3/0644; G06F 3/0659; G06F 3/0673
USPC ........................................................ 711/105
See application file for complete search history.

(56) References Cited

U.S. PATENT DOCUMENTS 10,235,083 B1 *    3/2019  Vora ...................... G06F 3/0647
2018/0307621 A1 *  10/2018  Surti .................. G06F 12/1009

FOREIGN PATENT DOCUMENTS

WO    WO-2022159684 A1 *  7/2022  ............. A63F 13/52

* cited by examiner

*Primary Examiner* — Mardochee Chery
(74) *Attorney, Agent, or Firm* — Leydig, Voit & Mayer, Ltd.

(57) ABSTRACT

Embodiments of the present disclosure relate to memory page access instrumentation for generating a memory access profile. The memory access profile may be used to co-locate data near the processing unit that accesses the data, reducing memory access energy by minimizing distances to access data that is co-located with a different processing unit (i.e., remote data). Execution thread arrays and memory pages for execution of a program are partitioned across multiple processing units. The partitions are then each mapped to a specific processing unit to minimize inter-partition traffic given the processing unit physical topology.

20 Claims, 10 Drawing Sheets

MEMORY PAGE ACCESS INSTRUMENTATION

BACKGROUND

Compute throughput is increasing more rapidly than memory bandwidth, so that the performance of memory access intensive applications is limited. Recently, high bandwidth memory access is enabled by vertically stacking one or more memory dies on a processor. Conventional solutions rely on explicit management of data placement and program execution to co-locate data near the processing unit that accesses the data. For example, when a device includes multiple processing units, each stacked with a local memory, performance is improved when the data accessed by the processing unit are located in the local memory that is directly coupled to the processing unit via a high bandwidth interface. Conventional solutions migrate program instructions or data between different processing units or local memories, respectively, to co-locate the data and improve performance and/or reduce energy. However, migrating the program instructions or data also consumes memory bandwidth and energy. There is a need for addressing these issues and/or other issues associated with the prior art.

SUMMARY

Embodiments of the present disclosure relate to memory page access instrumentation. Systems and methods are disclosed for generating a memory access profile. The memory access profile may be used to co-locate data near the processing unit that accesses the data when memory is stacked on a processing unit. The memory access profile may be used to reduce memory access energy by minimizing distances to access data that is co-located with a different processing unit (i.e., remote data).

Execution thread arrays (TAs) and memory pages are partitioned across n partitions (clusters of TAs and memory pages), where n is the number of processing tiles. The execution thread arrays and memory pages should be evenly distributed between the n partitions (the number of memory pages per execution thread may vary). The n partitions are then each mapped to a specific processing unit to reduce or minimize inter-partition traffic given the processing unit physical topology. For a two-dimensional array topology, each processing unit (tile) is connected to up to four primary neighbor processing units. To access a processing unit's local memory costs zero hops. To access a primary neighbor processing unit's local memory costs one hop, where a number of hops indicates the number of link connections that are traversed within the inter-tile network. To access a local memory of a secondary neighbor (primary neighbor's primary neighbor) costs two hops, and so on. The inter-partition traffic increases as the number of hops increases. In other words, all remote data accesses are not equal in terms of energy cost.

Successful partitioning and mapping depend on accurate tracking of memory page accesses by execution threads. In contrast to conventional systems, such as those described above, a memory access profile is generated for each execution thread and the partitioning and mapping is performed to minimize inter-partition traffic and reduce memory access energy. In an embodiment, the memory access profiles are converted into a bipartite undirected graph to perform partitioning. Conventional techniques may be used to perform the mapping. Pages may also be migrated and/or duplicated to reduce energy consumption.

In an embodiment, the method includes distributing execution of a program to multiple processing units, where each processing unit is directly coupled to a local memory of a memory system and indirectly coupled to the local memories that are directly coupled to the remaining processing units. A first portion of the program is launched for execution as a first thread array by a first processing unit of the processing units, where pages of the memory system are assigned to a set of counters. For accesses of the memory system during execution of the first thread array, the counter associated with the page specified by the access is updated and, in response to completion of execution of the first thread array, at least a portion of the set of counters is read to produce a memory access profile for the first thread array.

BRIEF DESCRIPTION OF THE DRAWINGS

The present systems and methods for memory page access instrumentation are described in detail below with reference to the attached drawing figures, wherein.

DETAILED DESCRIPTION

Systems and methods are disclosed related to memory page access instrumentation. Recently, high bandwidth memory access is enabled by vertically stacking one or more memory dies on a processor. For example, a device includes multiple processing units and memory with each processing unit having a local memory vertically stacked upon it and directly coupled to the processing unit via a high bandwidth interface. Memory access performance is improved when the data accessed by the processing unit are located in the local memory that is directly coupled to the processing unit. To minimize memory access energy, not only should the data be co-located in the local memory, distances to access data that is co-located with a different processing unit (i.e., remote data) should be minimized. In other words, all remote data accesses are not equal in terms of energy cost.

The memory page access instrumentation enables generation of memory access profiles. The memory access profiles may be used to co-locate data near the processing unit that accesses the data. The memory access profiles may be used to reduce memory access energy by reducing distances to access data that is co-located with a different processing unit (i.e., remote data).

Figure 1A:
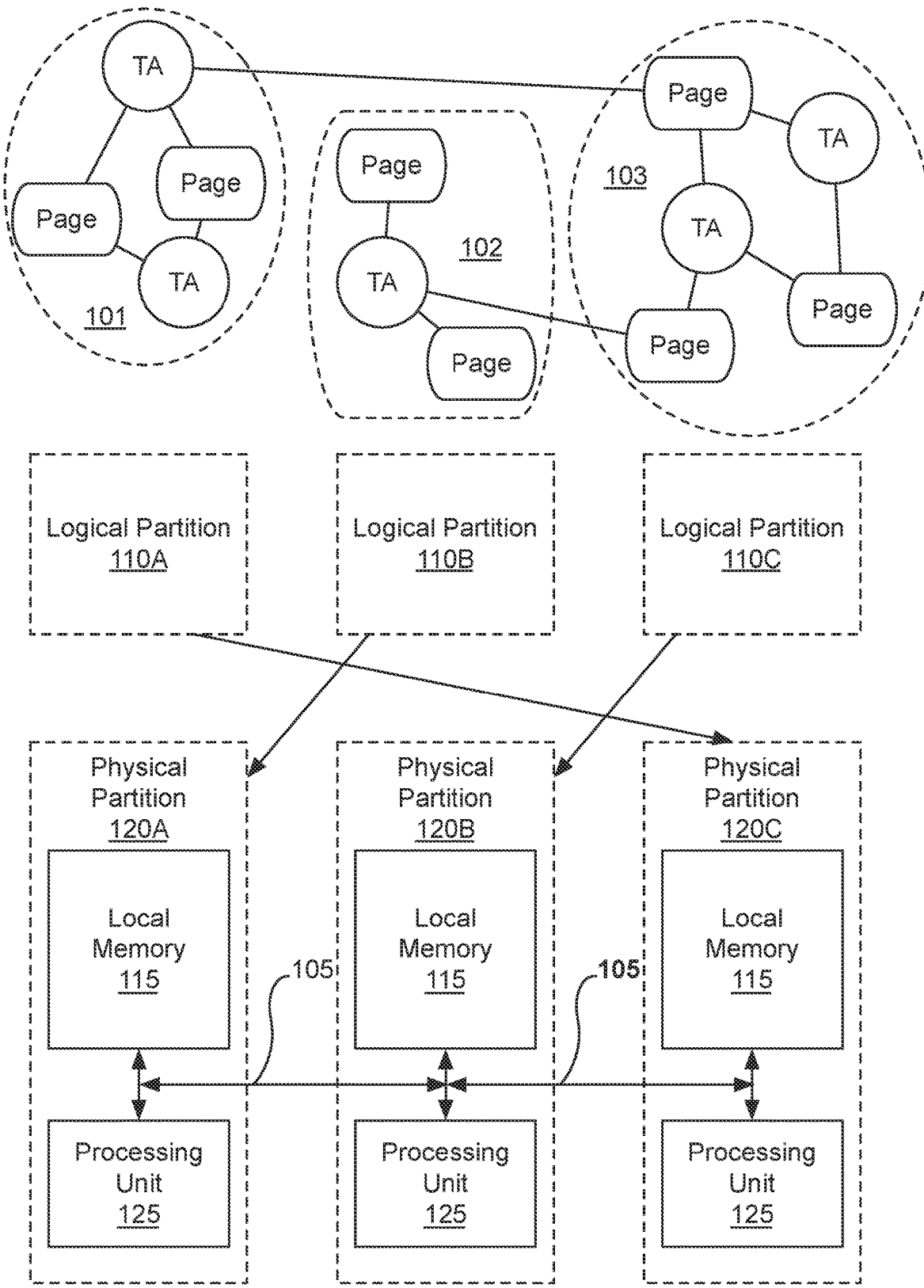
FIG. 1A illustrates process and page partitioning and mapping logical partitions to physical processing units according to memory page access profiles, in accordance with an embodiment.

FIG. 1A illustrates process and page partitioning and mapping logical partitions to physical processing units according to memory page access profiles, in accordance with an embodiment. In an embodiment, a program comprising instructions may be executed on a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. The group of threads comprises an execution thread array (TA) and each processing unit 125 may execute one or more thread arrays simultaneously. Each thread array is allocated one or more memory pages (pages) to execute at least a portion of the program instructions assigned to the thread array. During execution by a processing unit 125, a thread array may generate results or intermediate data that is stored in local memory 115 that is directly coupled to the processing unit 125. The results or intermediate data may be consumed by the same thread array, a different thread array executing on the same processing unit 125, or a remote thread array executing on a different processing unit 125. The memory access profiles may be used to determine the particular processing unit 125 that is assigned to execute each of the thread arrays.

First, the thread arrays and memory pages (pages) are partitioned across n logical partitions 110, where n is the number of processing units 125. Conceptually, the thread arrays and pages are organized into clusters, such as clusters 101, 102, and 103 to minimize inter-cluster communication. As shown in FIG. 1A, a thread array in each of the clusters 101 and 102 communicates with a memory page in the cluster 103. Each cluster is associated with a respective one of the logical partitions 110. The clusters 101, 102, and 103 are associated with the logical partitions 110A, 110B, and 110C, respectively. In other words, the thread arrays and pages are partitioned into the logical partitions 110.

The thread arrays and pages should be evenly distributed between the n logical partitions 110 (the number of memory pages per thread array may vary). In an embodiment, the thread arrays are evenly distributed between the n logical partitions 110 and the pages are evenly distributed between the n logical partitions 110. The n logical partitions 110 are then each mapped to a specific physical partition 120 to minimize inter-partition traffic given the physical topology of the processing units 125 and local memories 115. As shown in FIG. 1A, the physical partition 120B is coupled between the physical partition 120A and the physical partition 120C. In the context of the following description, the physical partitions 120A and 120B are primary neighbors, the physical partitions 120C and 120B are primary neighbors, and the physical partitions 120A and 120C are secondary neighbors (primary neighbor's primary neighbor).

To access a processing unit's 125 local memory 115 costs zero hops. To access a primary neighbor processing unit's 125 local memory 115 costs one hop, where a number of hops indicates the number of links 105 that are traversed within the physical partition 120 topology (inter-tile network). To access a local memory 115 of a secondary neighbor processing unit 125 costs two hops, and so on. For a two-dimensional array topology (not shown), each processing unit 125 is connected to up to four primary neighbor processing units 125. The inter-partition traffic increases as the number of hops increases and all remote data accesses are not equal in terms of energy cost. In contrast, most conventional solutions assume that remote memory accesses are equally expensive.

After the thread arrays and pages are partitioned into the logical partitions 110, the logical partitions 110 are mapped to the physical partitions 120. In an embodiment, each physical partition 120 comprises one processing unit 125 configured to execute one or more execution thread arrays, where the processing unit 125 is directly coupled to a local memory 115 including one or more memory pages. The logical partitions 110A, 110B, and 110C are mapped to the physical partitions 120C, 120A, and 120B, respectively. Mapping the logical partition 110B to the physical partition 120 minimizes the inter-partition traffic.

Successful partitioning and mapping depend on accurate tracking of memory page accesses by execution threads. In contrast to conventional systems, a memory access profile is generated for each execution thread and the partitioning and mapping is performed to reduce inter-partition traffic and reduce memory access energy. In an embodiment, the memory access profiles are converted into a bipartite undirected graph to perform partitioning. In an embodiment, weights for each edge in the bipartite undirected graph define a count of memory accesses. Conventional techniques may be used to perform the mapping. In an embodiment, memory pages may also be migrated between the local memories 115 and/or duplicated to reduce energy consumption.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
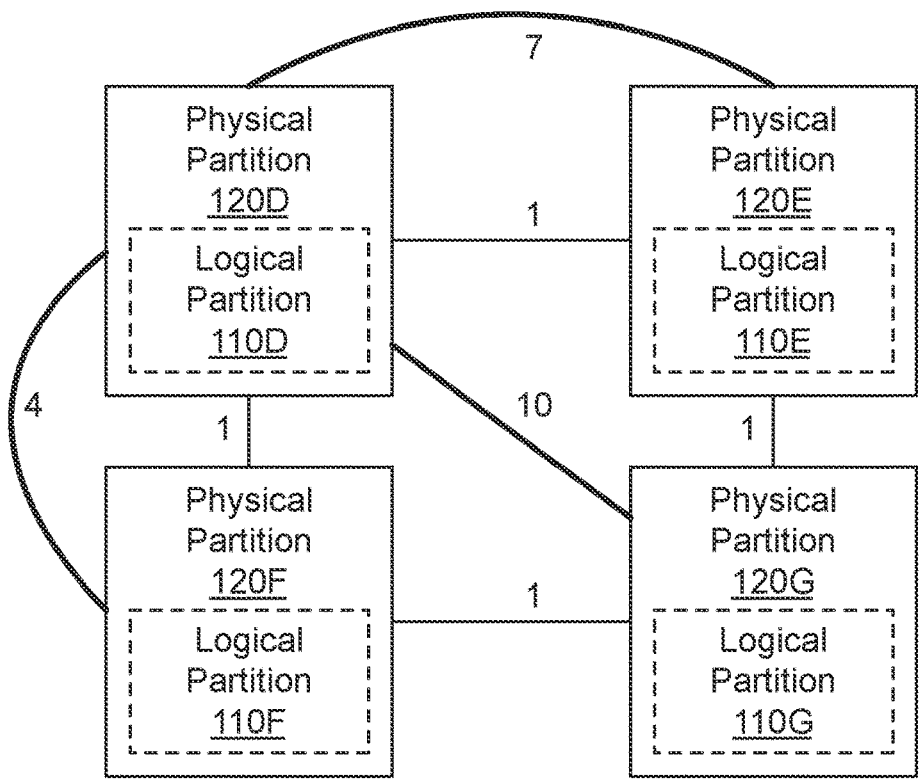
FIG. 1B illustrates mapping logical partitions to physical partitions, in accordance with an embodiment.

FIG. 1B illustrates mapping logical partitions to physical partitions, in accordance with an embodiment. Logical partitions 110D, 110E, 110F, and 110G are mapped to physical partitions 120D, 120E, 120F, and 120G, respectively. Link connections between primary neighbors in a two-dimensional array, such as the link connections between the physical partitions 120D and 120E, physical partitions 120D and 120F, physical partitions 120F and 120G, and physical partitions 120G and 120E, each have a cost of one hop for traversing the link connection. Other topologies are possible, such as a torus with link connections that loop around from the rightmost physical partitions 120E and 120G, to the leftmost physical partitions 120D and 120F, respectively. Such long "wraparound" link connections may have a much higher relative cost to traverse compared with the link connections shown in FIG. 1B. Generally, the hop cost is the Manhattan distance traversed for a mesh topology interconnect and is the Hamming distance for a hypercube topology interconnect. In an embodiment, different link connections have different costs.

The thicker connections in FIG. 1B are labeled with a number of non-local (remote) accesses between two physical partitions 120 obtained from the memory access profiles. For example, according to the memory access profiles, the number of remote accesses between the physical partitions 120D and 120E, physical partitions 120D and 120F, and physical partitions 120D and 120G is 7, 4, and 10, respectively. Therefore, the total hop cost is computed as 7×1+4×1+10×2=31 hops.

Figure 1C:
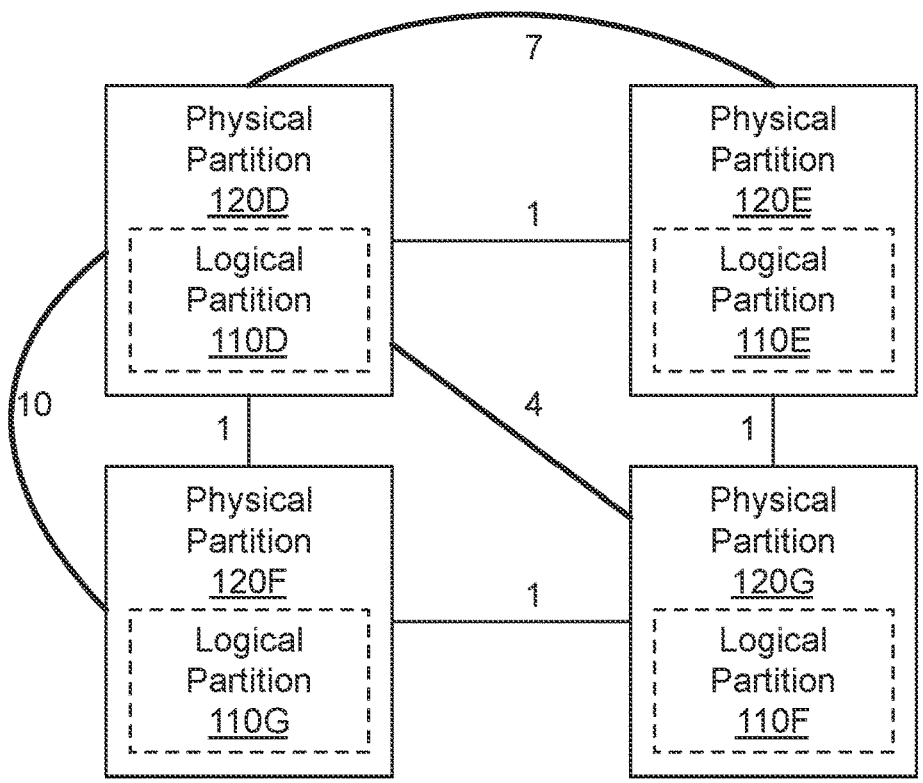
FIG. 1C illustrates mapping logical partitions to physical partitions to minimize inter-partition traffic, in accordance with an embodiment.

FIG. 1C illustrates mapping logical partitions to physical partitions to minimize inter-partition traffic, in accordance with an embodiment. Compared with the mapping shown in FIG. 1B, the logical partitions 110F and 110G are swapped. Specifically, the logical partitions 110D, 110E, 110F, and 110G are mapped to physical partitions 120D, 120E, 120G, and 120F, respectively. The total hop cost is computed as 7×1+10×1+4×2=25 hops. The mapping used in FIG. 1C reduces the total hop cost from 31 to 25.

A key input to the partitioning and mapping algorithms is knowledge of the memory pages accessed by each thread array and how often the memory pages are accessed. A memory access profile may be generated for each thread array to provide the necessary information. To accelerate memory access profile generation, per-memory page counters are implemented for a number of thread arrays.

Figure 2:
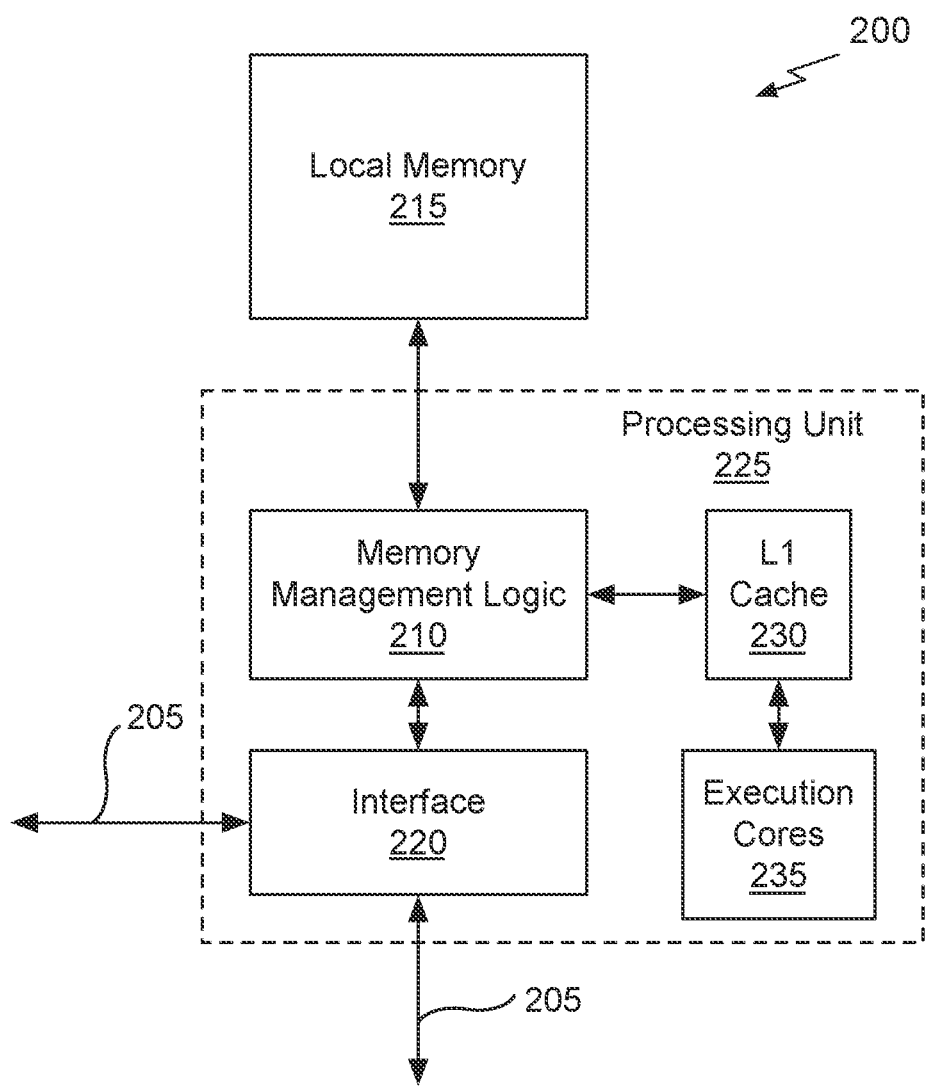
FIG. 2 illustrates a block diagram of an example instrumented processing system suitable for use in implementing some embodiments of the present disclosure.

FIG. 2 illustrates a block diagram of an example instrumented processing system 200 suitable for use in implementing some embodiments of the present disclosure. The instrumented processing system 200 comprises a local memory 215 that is directly coupled to a processing unit 225. The processing unit 225 comprises memory management logic 210, an L1 cache 230, execution cores 235, and an interface 220. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the instrumented processing system 200 is within the scope and spirit of embodiments of the present disclosure.

In an embodiment, the local memory 215 and the processing unit 225 are the local memory 115 and the processing unit 125. Multiple local memories 215 and processing units 225 may be enclosed within a package with each local memory 215 stacked with a respective processing unit 225 to minimize lengths of connections between the local memory 215 and the processing unit 225. In an embodiment, stacking provides vertical connections for signals instead of routing the signals to pads located at the perimeter of the die. The execution cores 235 are configured to execute one or more thread arrays and may include shared memory and/a register for data storage and communication between the threads each thread array and/or the execution cores 235.

The L1 cache 230 comprises storage for data that may also be stored in the local memory 215 or another local memory 215. In an embodiment, the processing unit 225 may include multiple L1 caches 230 and one or more L2 caches. In an embodiment, the L1 caches 230 and/or L2 caches only cache data in the one associated local memory 215. The interface 220 provides one or more link connections 205 that are coupled to other processing units 225. In an embodiment, the interface 220 also provides one or more link connections to other devices.

The memory management logic 210 steers memory access requests received from the execution cores 235 via the L1 cache 230 and requests from other processing units 225 received via a processor interface 220 to the correct memory. The memory management logic 210 routes each request from the L1 cache 230 for a remote memory access to the interface 220. Similarly, the memory management logic 210 routes each request from the L1 cache 230 for a local memory access to the local memory 215. The memory management logic 210 routes each request from the interface 220 to the local memory 220. Memory access requests received by the interface 220 from another processing unit 225 for a remote memory are routed through the interface 220 to another processing unit 225.

The memory management logic 210 generates the memory access profiles for thread arrays executed by the execution cores 235. Providing logic for generating the memory access profiles in the memory management logic 210 accelerates generation of the profiles compared with software only implementations. The memory management logic 210 may provide per-memory page counters for a number of thread arrays. In an embodiment, the number of thread arrays is a maximum number of thread arrays that the execution cores 235 can simultaneously execute. In an embodiment, the counters are stored in portion of each memory page in the local memory 215. For example, each 2 MB memory page allocated by the system is actually 2 MB+8 KB in size to hold the extra counters. In an embodiment, a 16-bit counter is reserved for each 2 MB page. In an embodiment, a system including 256 processing units 225 that can each execute up to 16 thread arrays simultaneously needs 4096 hardware managed counters per memory page consuming a total of 8 KB of memory, assuming each counter is 16-bits. In an embodiment, the counters are saturating, so that when a maximum value is reached the maximum value is maintained until the counter is cleared. In an embodiment, the counters can be cached in the L1 cache 230 and the local memory 215 is a backing store. In an embodiment, the counters are stored in an L2 or last level cache associated with the local memory 215 where the associated memory page is stored. In another embodiment, the counters are stored in a portion of the local memory 215 allocated specifically for the counters.

In an embodiment, logical thread array IDs associated with the processing unit 225 that executes the particular thread array are used to access the counters and correspond to a physical execution slot assigned to the thread array. When execution of the thread array finishes, the counter value is read out and the counter is reset. The counter values for all pages accessed by the thread array are stored as a memory access profile log that is associated with the logical thread array ID. The memory access profile that is generated, logically, is a count for each virtual page of memory of how many times the virtual page was referenced (accessed) by each thread array executed during execution of the program. The number of virtual memory pages referenced during the execution of a program can exceed the physical memory pages that can be resident in the memory system at any given time. Similarly, the number of thread arrays executed can exceed the number of thread arrays that can be simultaneously executing in the processing units 225.

In an embodiment, an array of counters equal in size to the total virtual pages times total thread arrays launched is created, and the counters are incremented for accesses based on the logical thread array ID and the virtual address of the page referenced. Unfortunately, the total number of virtual pages accessed and the total number of thread arrays launched are not knowable, in general, at the start of program execution. Allocating enough counters for the worst case is impractically large. Therefore, a more efficient technique is needed to collect the memory access information.

In one embodiment, each hardware managed counter is implemented as a counter slot corresponding to both the physical thread array ID for the counter and the physically resident memory page referenced by the thread array. Implementing the counters in this manner ensures that there is a fixed amount of memory overhead for the hardware managed counters and that indexing of the counters in hardware is straightforward, regardless of the total number of thread arrays that are launched during execution of a program. Counting references during the execution of a thread array is possible without consuming an impractical amount of memory. When a thread array at a given physical execution slot completes, an entry for the logical thread array ID that just completed is created in a memory access profile log. The counters at the physical execution slot position for all physically resident memory pages are examined. Each counter storing a non-zero value is cleared and the virtual page ID corresponding to the physical memory page is combined with the counter value and appended to the memory access profile (log) for the logical thread ID. In an embodiment, the memory access profile is stored in a region allocated in a portion of the memory system separate from the counters. In some embodiments, the memory access profile is a file stored in a solid state drive or other storage resource.

In an embodiment, the physical execution slot that the logical thread array ID is associated with for execution is also stored with the memory access profile. In an embodiment, the memory access counts are tracked without temporal information. In an embodiment, an order in which the thread arrays complete execution is included in the memory access profiles along with the memory access counts.

In an embodiment, if a first virtual memory page is swapped out of the memory system for a second virtual memory page during execution of the program, entries in the memory access profile are appended with any non-zero counter values of the swapped out memory page for the logical thread array IDs. In another embodiment, counter values for the first virtual memory page that is swapped out are simply discarded (without being read) because it is likely that the memory page has not been recently referenced and is unlikely to significantly contribute to access counts of any currently executing thread array. However, there is some potential loss in accuracy in the access profile with such a simplified approach. In any case, counts for the second virtual memory page that is swapped in are set to all zeros.

In an embodiment, the counters only profile accesses resulting from misses in the L1 cache 230. In an embodiment, the counter for a page is updated for every Nth access (or randomly selected accesses) of the page. While some accuracy is lost by not updating for every access, the counters should detect heavily referenced pages with adequate accuracy. In an embodiment, read accesses are tracked separately from write accesses. In an embodiment, a single bit is stored for each page (supplementing the counter) to indicate whether the page is accessed or not.

In an embodiment, the L1 caches 230 track which thread array caused a given line to be fetched into the L1 cache 230, so that an access by a different thread array accessing the cache line is counted even though no memory access was needed. Tracking the thread array causing a line to be fetched may improve accuracy of the memory access profiles by capturing thread array page accesses that might otherwise be hidden because two thread arrays executing in the processing unit 225 access the same page.

For some programs, during execution a given thread array will only touch a small number of memory pages, such as 10% or less than 50% of the memory pages. When each thread array completes execution, it is expensive in terms of time and energy consumption to check the counter value of each physical memory page (of which there may be tens of thousands). The overhead for checking the counters is especially onerous when a majority of the counters will be zero. In an embodiment, a bloom filter is applied to the counter values read for the thread array to indicate the non-cleared counter values (reducing the number of counter values that need to be examined to generate the profile). For example, when only sixteen pages are accessed by a thread array, using a 1024-bit bloom filter reduces the number of counters that must be read to approximately 16/1024=1.6% of the total pages, providing a significant savings in terms of time.

Another approach for the case where a single thread array only touches a small number of the memory pages (e.g., less than 20%) is to implement a small reference (access) count cache within each processing unit 225. Before a thread array starts executing, the cache entries for the thread array are cleared. When a page is touched, if the page is a hit in the reference count cache, the count is incremented. On a miss, if there is an available unused entry in the reference count cache, the entry is assigned to the page and the count is set to one. If there is no available entry in the reference count cache, the least recently used entry is evicted and is used to make room for the newly referenced (accessed) page. The evicted page increments the in-memory counter for the page with the count value from the reference count cache entry. For instance, in an embodiment, each thread array has a n-entry cache to collect page references for up to n different pages. If a n+1 page is referenced, then the evicted page can increment the appropriate counter by the reference count in the entry. Therefore, in the case where a large number of pages are referenced, the reference count cache can potentially reduce the number of counter increments sent to the memory system. But in the case where, at the end of thread array execution, there are no evictions from the reference count cache (meaning n or fewer pages were touched) then the contents of the reference count cache alone can be used to populate the memory access profile. Implementing the reference count cache avoids the counter reads of memory for many thread array executions, especially for short-lived thread array executions that touch a small number of pages, where the overheads of reading the counters is high.

In an embodiment, at least a portion of the processing unit 225 is included in a virtual machine. In an embodiment, the processing unit 225 is part of a server or data center, and data stored in the memory system is streamed to a user device. In an embodiment, the processing unit 225 generates data used for training, testing, or certifying a neural network employed in a machine, robot, or autonomous vehicle. In an embodiment, at least a portion of the processing unit 225 is included in a cloud computing environment.

In an embodiment, the logical partitioning and the logical to physical mapping are provided to a runtime system when program is launched for execution. The logical partitioning and logical to physical mapping provides lists of thread array IDs for each processing unit 225. In an embodiment, the logical partitioning and logical to physical mapping enables a thread array scheduler within a processor that includes multiple processing units 225 to launch each thread array ID to the processing unit 225 to which the thread array ID is mapped when execution resources in the processing unit 225 are available. The logical to physical mapping provides a data placement map that may be used by a driver/resource manager (or memory allocation kernel routines in a CPU) to determine in which local memory 215 a physical memory page will be allocated in response to each memory allocation request by the kernel. In an embodiment, the memory access profiles also include memory allocation requests. Including the memory allocation requests provides information about specific memory page addresses. For example, specific memory pages may be associated with a third invocation of malloc for a size of 12 MB on line 24 of the program. The logical partitioning may effectively annotate that the six 2 MB physical memory pages for the 12 MB allocation should be in the local memories 215 of the processing units 225 mapped to the thread array IDs 12, 12, 17, 18, 22, and 27. A page placement map provided by the logical partitioning and the logical to physical mapping may be used by low-level memory allocation routines.

A memory page may be considered to be "popular" if the memory page has a majority of accesses that are from remote thread arrays. For popular memory pages that are written, and after being written are only read, the memory page can be copied to multiple local memories 215. In an embodiment, a popular memory page is mapped to distribute the page uniformly across all processing units 225. When a popular page is distributed, the average number of hops to access a given piece of data by a thread array executing on each processing unit 225 will be the random any-to-any distance. For example, an average of 10.6 hops in a 16×16 two-dimensional array of processing units 225, as compared to an average of 8 hops if the popular page is mapped in the best-case to one of the centermost processing units 225 in the 16×16 array topology. Allocating a popular page in a distributed manner may alleviate the interconnect and memory bandwidth contention issues.

Figure 3A:
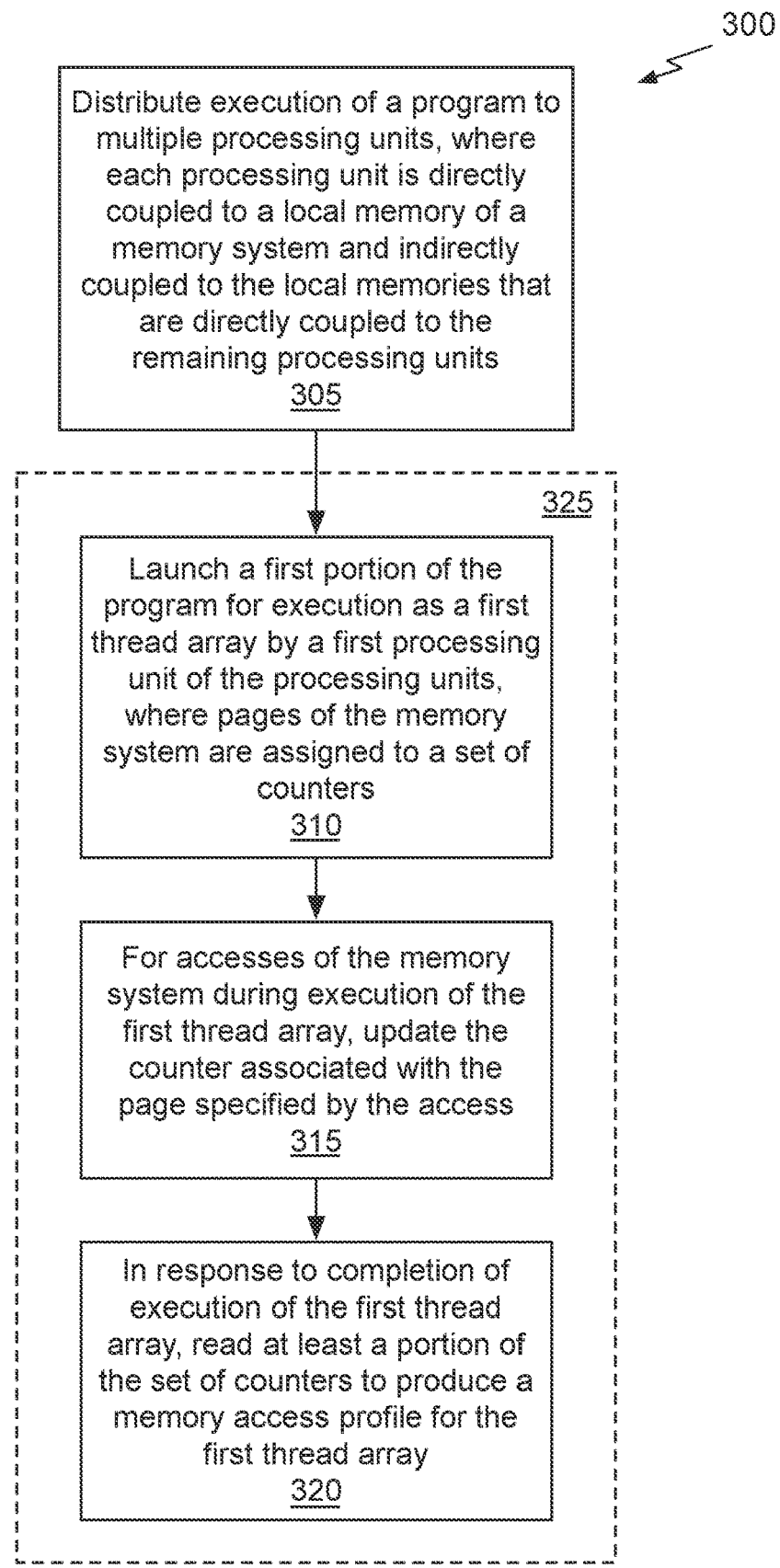
FIG. 3A illustrates a flowchart of a method for generating a memory access profile, in accordance with an embodiment.

FIG. 3A illustrates a flowchart of a method 300 for generating a memory access profile, in accordance with an embodiment. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the instrumented processing system 200 of FIG. 2. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 305, execution of a program is distributed to multiple processing units 225, where each processing unit 225 is directly coupled to a local memory 215 of a memory system and indirectly coupled to the local memories 215 that are directly coupled to the remaining processing units 225. In an embodiment, the interface 220 provides the indirect link connections 205 to local memories 215 of the remote processing units 225. In an embodiment, step 305 comprises partitioning the program into the first thread array associated with first memory pages of the memory system and additional thread arrays associated with additional memory pages of the memory system, and then mapping each partition to a corresponding processing unit 225. In an embodiment, a plurality of thread arrays to be executed by the multiple processing units 225 and memory pages in the memory system are distributed to logical partitions 110.

In an embodiment, each local memory 215 comprises a memory stack that is aligned with the corresponding processing unit 225 in either a vertical or horizontal direction. In an embodiment, bandwidth between each processing unit 225 and the local memory 215 that is directly coupled to the remaining processing units 225 decreases as a distance between the processing unit 225 and the remaining processing units 225 increases. In other words, the bandwidth decreases as the number of hops incurred by the processing unit 225 to access a page in one of the local memories 215 increases. In an embodiment, energy consumed by each processing unit 225 accessing the local memory 215 that is directly coupled to the remaining processing units 225 increases as a distance between the processing unit 225 and the remaining processing units 225 increases. In other words, the energy consumed for a memory page access increases as the number of hops incurred by the processing unit 225 to access the memory page in one of the local memories 215 increases.

At step 310, a first portion of the program is launched for execution as a first thread array by a first processing unit 225 of the processing units 225, where pages of the memory system are assigned a set of counters. In an embodiment, each page of the memory system is assigned to a corresponding counter in the set of counters. In an embodiment, the counter for a first page tracks read accesses separately from write accesses. In an embodiment, the counter for a first page tracks accesses resulting in a cache miss. In an embodiment, the counter for a first page tracks accesses to a cache line fetched in response to an access of the memory system by a second thread array. At step 315, for accesses of the memory system during execution of the first thread array, the counter associated with the page specified by the access is updated. In an embodiment, a counter is updated for each one of the memory system accesses.

At step 320, in response to completion of execution of the first thread array, at least a portion of the set of counters is read to produce a memory access profile for the first thread array. In an embodiment, the counter values for all pages accessed by the thread array are stored as a memory access profile log that is associated with the logical thread array ID. In an embodiment, when a first virtual memory page is swapped out of the memory system for a second virtual memory page during execution of the program, the memory access profile is updated with each counter in the set of counters assigned to the first virtual memory page for the first thread array that has a non-zero counter value. In an embodiment, when a first virtual memory page is swapped out of the memory system for a second virtual memory page during execution of the program, counter values of each counter in the set of counters assigned to the first virtual memory page are discarded.

In an embodiment, the memory access profile is produced by applying a bloom filter to the set of counters. In an embodiment, the set of counters is initialized when the set of counters is read. In other words, the counter is read and then cleared in a single read-clear operation. In an embodiment, a small reference (access) count cache is included within each processing unit 225. The reference count cache is used to count page accesses, and when an entry assigned to a page is evicted, the count stored in the entry is accumulated with the in-memory counter for the page. The reference count cache can potentially reduce the number of counter increments sent to the memory system. But in the case where, at the end of thread array execution, there are no evictions from the reference count cache, reading the counters from memory may be avoided.

In an embodiment, a step 325 comprises steps 310, 315, and 320. In an embodiment, step 325 is performed in parallel by the first thread array and additional thread arrays to execute the entire program. In an embodiment, step 325 is performed in parallel by the first thread array and additional thread arrays to execute additional portions of the program and step 325 is repeated until the entire program is executed.

Figure 3B:
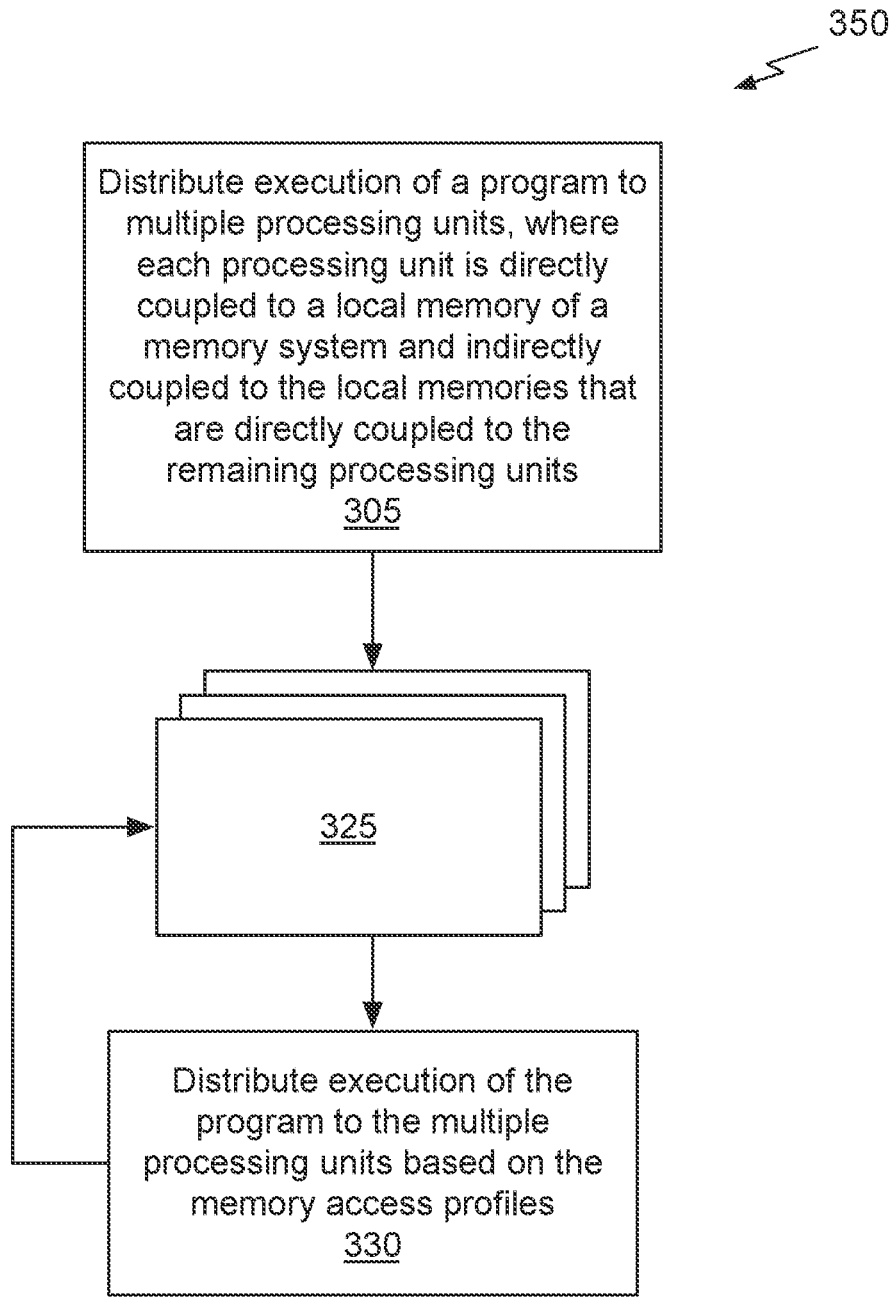
FIG. 3B illustrates a flowchart of a method for reducing memory access energy during execution of a program, in accordance with an embodiment.

FIG. 3B illustrates a flowchart of a method 350 for reducing memory access energy during execution of a program that includes the method 300, in accordance with an embodiment. In an embodiment, steps 305 and 325 are followed by step 330 that distributes execution of the program to the multiple processing units 225 based on the memory access profiles. In an embodiment, execution of the program is distributed to minimize remote memory accesses. In an embodiment, a memory page that is accessed by two or more of the multiple processing units 225 is identified and the memory page is distributed across the local memories 215 of the two or more of the multiple processing units 225. In an embodiment, execution of the program is distributed by the logical partitioning and the logical to physical mapping described in conjunction with FIGS. 1A and 1B. In an embodiment, steps 325 and 330 are repeated until the remote memory accesses are minimized or reduced below a predetermined threshold. In an embodiment, steps 325 and 330 are repeated until the remote memory accesses are minimized or reduced below a predetermined threshold.

Implementing logic within each processing unit 225 for memory page access instrumentation enables the generation of memory access profiles. The memory access profile may be used to co-locate data near the specific processing unit 225 that accesses the data, reducing memory access energy by minimizing distances to access data that is co-located with a different processing unit 225 (i.e., remote data). Execution thread arrays and memory pages for execution of a program are partitioned across multiple processing units 225. The partitions are then each mapped to a specific processing unit 225 to minimize inter-partition traffic given the processing unit physical topology. The memory access profile technique is compatible with existing software and does not require specific programmer effort to generate the memory access profiles. The memory page access instrumentation logic adapts to different software implementations and different topologies. The memory access profiles enable co-location of data near the processing units 225, performing better than dynamic schemes that attempt to migrate program execution or data storage.

Parallel Processing Architecture

Figure 4:
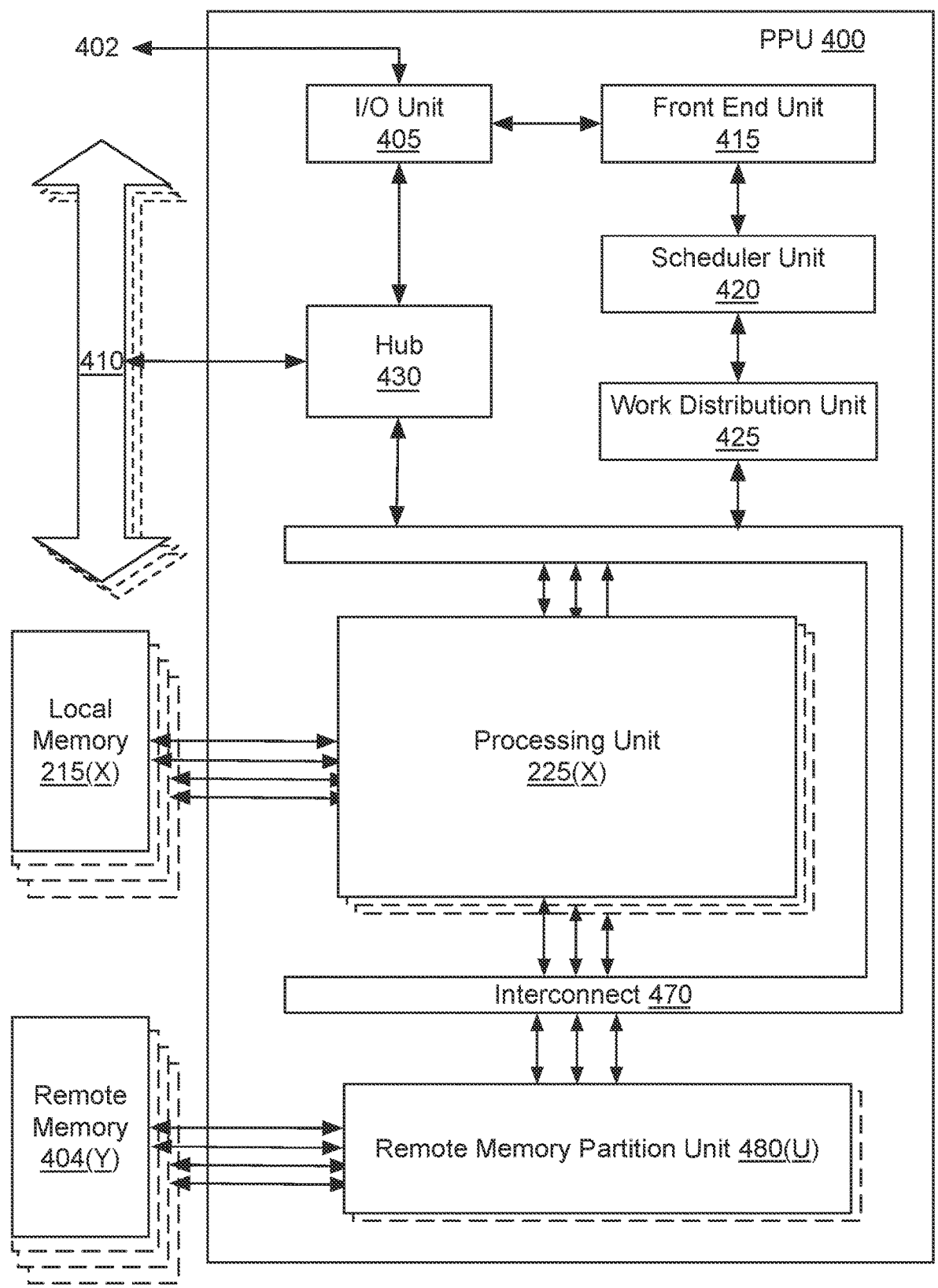
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement a processor that includes multiple processing units 225. The PPU 400 may be configured to generate memory access profiles during execution of a program. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, an interconnect 470, one or more processing units (125 or) 225, and one or more remote memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 215 and remote memory 404 comprising a number of memory devices. In an embodiment, the local memory 215 and remote memory 404 may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various processing units 225 to process tasks defined by the one or more streams. The scheduler unit 420 is configured to track state information related to the various tasks managed by the scheduler unit 420. The state may indicate which processing unit 225 a task is assigned to, whether the task is active or inactive, a priority level associated with the task, and so forth. The scheduler unit 420 manages the execution of a plurality of tasks on the one or more processing units 225.

The scheduler unit 420 is coupled to a work distribution unit 425 that is configured to dispatch tasks for execution on the processing units 225. The work distribution unit 425 may track a number of scheduled tasks received from the scheduler unit 420. In an embodiment, the work distribution unit 425 manages a pending task pool and an active task pool for each of the processing units 225. As a processing unit 225 finishes the execution of a task, that task is evicted from the active task pool for the processing unit 225 and one of the other tasks from the pending task pool is selected and scheduled for execution on the processing unit 225. If an active task has been idle on the processing unit 225, such as while waiting for a data dependency to be resolved, then the active task may be evicted from the processing unit 225 and returned to the pending task pool while another task in the pending task pool is selected and scheduled for execution on the processing unit 225.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QOS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a processing unit 225 and instructions are scheduled for execution by at least one warp.

The work distribution unit 425 communicates with the one or more processing units 225 via interconnect 470. The interconnect 470 is an interconnect network (e.g., crossbar, mesh, etc.) that couples many of the units of the PPU 400 to other units of the PPU 400. For example, the interconnect 470 may be configured to couple the work distribution unit 425 to a particular processing unit 225. Although not shown explicitly, one or more other units of the PPU 400 may also be connected to the interconnect 470 via the hub 430. Each one of U processing units 225 may be connected to a local memory 215, where each local memory 215 may comprise a high bandwidth memory stack.

The tasks are managed by the scheduler unit 420 and dispatched to a processing unit 225 by the work distribution unit 425. The processing unit 225 is configured to process the task and generate results. The results may be consumed by other tasks within the processing unit 225, routed to a different processing unit 225 via the interconnect 470, stored in the stacked local memory 215, or stored in the remote memory 404. In an embodiment, the remote memory 404 is fabricated on a separate die than the PPU 440. In an embodiment, the remote memory 404 is included within a separate package than the PPU 440. The results can be written to the remote memory 404 via the remote memory partition units 480, which implement a memory interface for reading and writing data to/from the remote memory 404. The results can be transmitted to another PPU 400 or CPU via the NVLink 410. In an embodiment, the PPU 400 includes a number U of remote memory partition units 480 that is equal to the number of link connections 205 coupled to the PPU 400. Each processing unit 225 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the remote memory 404.

In an embodiment, the remote memory partition unit 480 includes a Raster Operations (ROP) unit, a level two (L2) cache, and a memory interface that is coupled to the remote memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half (J. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the local memory 215 and/or the remote memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the remote memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The remote memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the remote memory 404 or other system memory may be fetched by the remote memory partition unit 480 and stored in an L2 cache, which is located on-chip and is shared between the various processing units 225. In an embodiment, each remote memory partition unit 480 includes a portion of the L2 cache associated with a corresponding remote memory 404. Lower level caches may then be implemented in various units within the processing units 225. Data from the L2 cache may be fetched and stored in each of the L1 caches 230 for processing.

In an embodiment, the processing units within each processing unit 225 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is 25 maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads (thread arrays) that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit, such as the processing unit 225 includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit 225 may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the local memory 215 or the remote memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units 225 to the local memory 215 and/or the remote memory partition unit 480. The shared memory can be used to cache reads and writes. One or more of the shared memory, L1 cache, L2 cache, the local memory 215, and remote memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units 225. Threads execute the same program, using a unique thread ID in the calculation to ensure each thread generates unique results, using the processing unit(s) to execute the program and perform calculations, shared memory to communicate between threads, and the LSU to read and write global memory through the shared memory and the remote memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the local memory 215, the remote memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
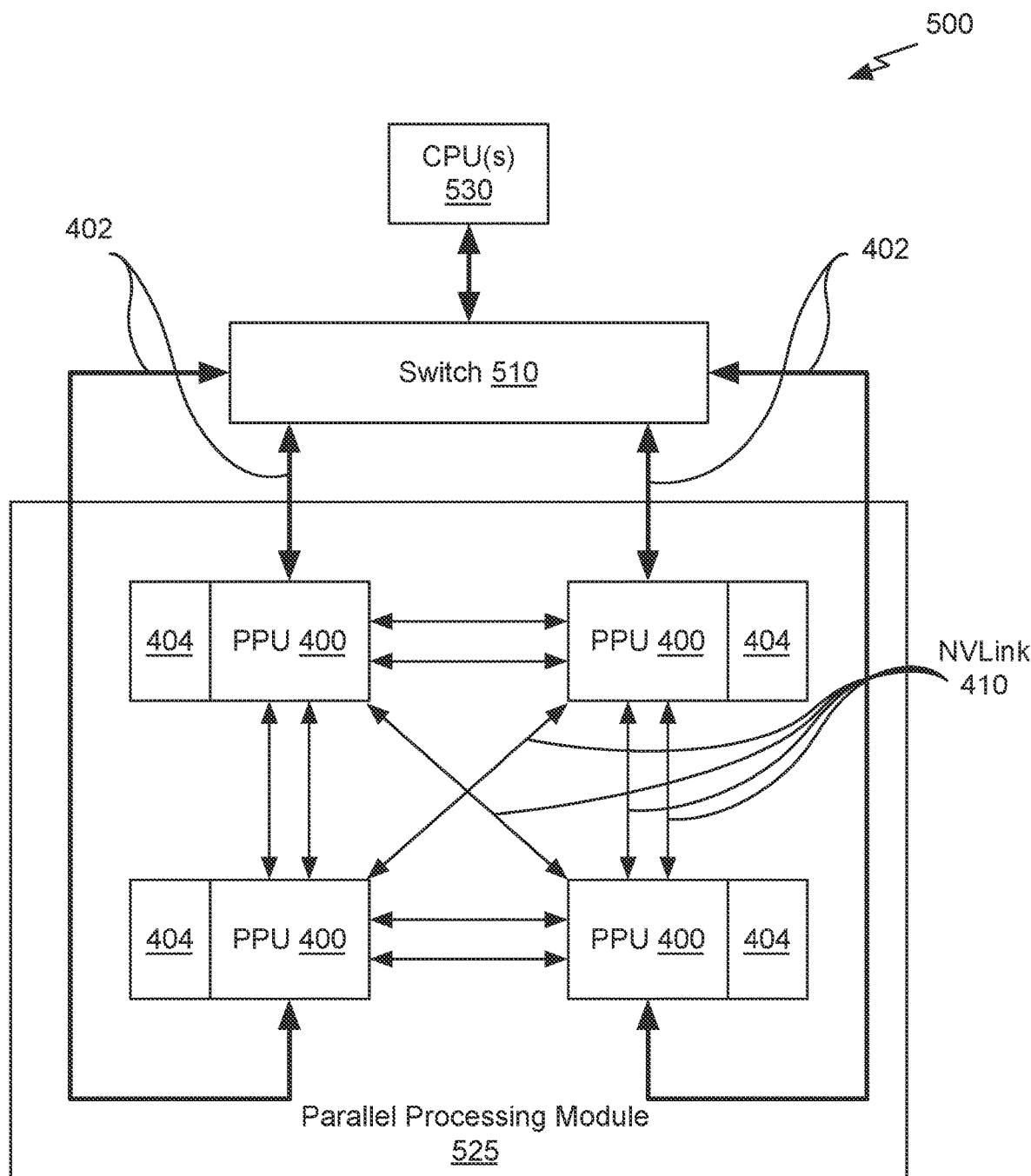
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 300 shown in FIG. 3A and/or the method 350 shown in FIG. 3B. The processing system 500 includes a CPU 530, switch 510, and multiple PPUs 400, local memories 215, and respective remote memories 404.

Figure 5B:
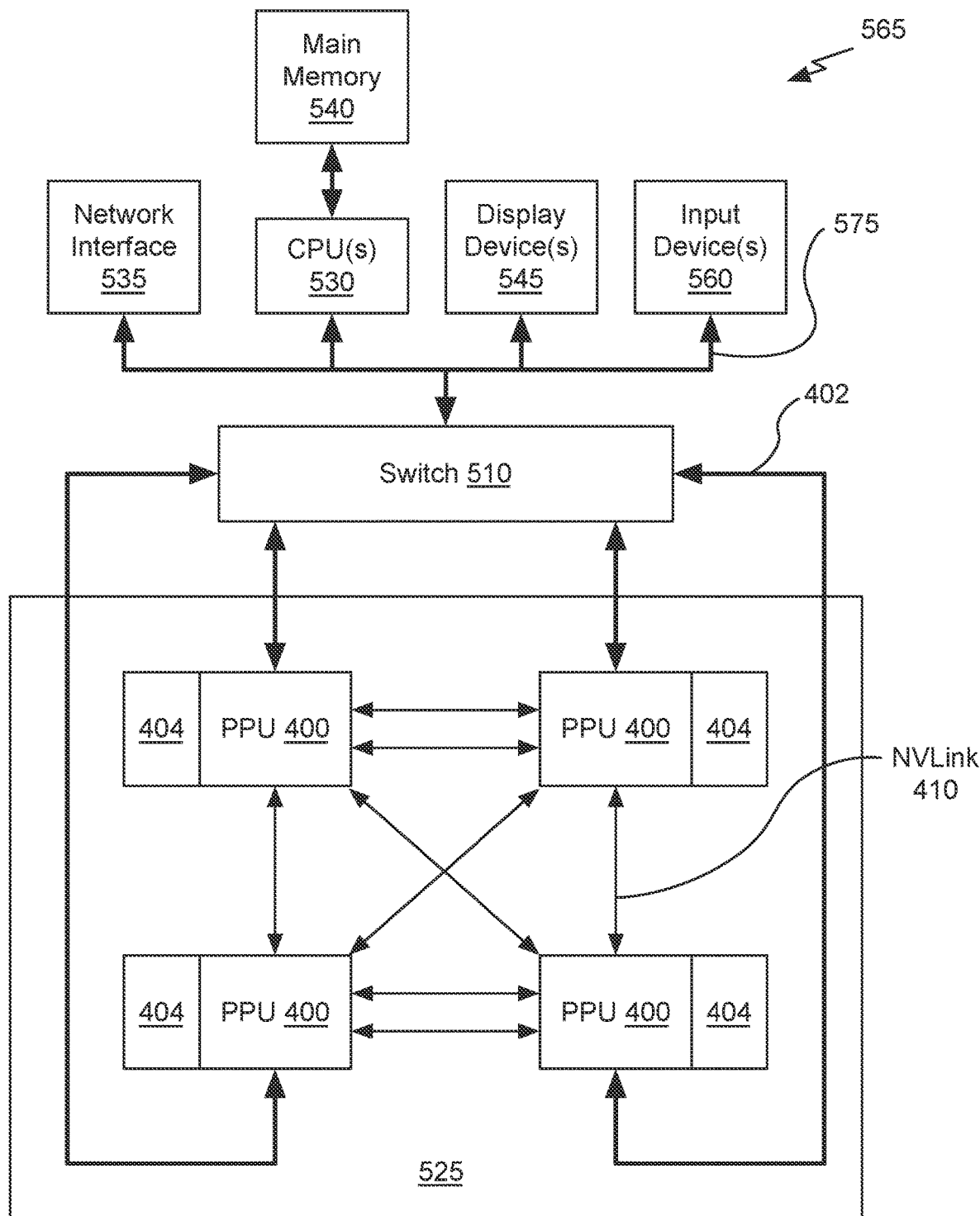
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, local memories 215, remote memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or remote memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabits/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 local memory 215. In an embodiment, the NVLink 410 supports coherency operations, allowing data read from the local memories 215 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 300 shown in FIG. 3A and/or the method 350 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
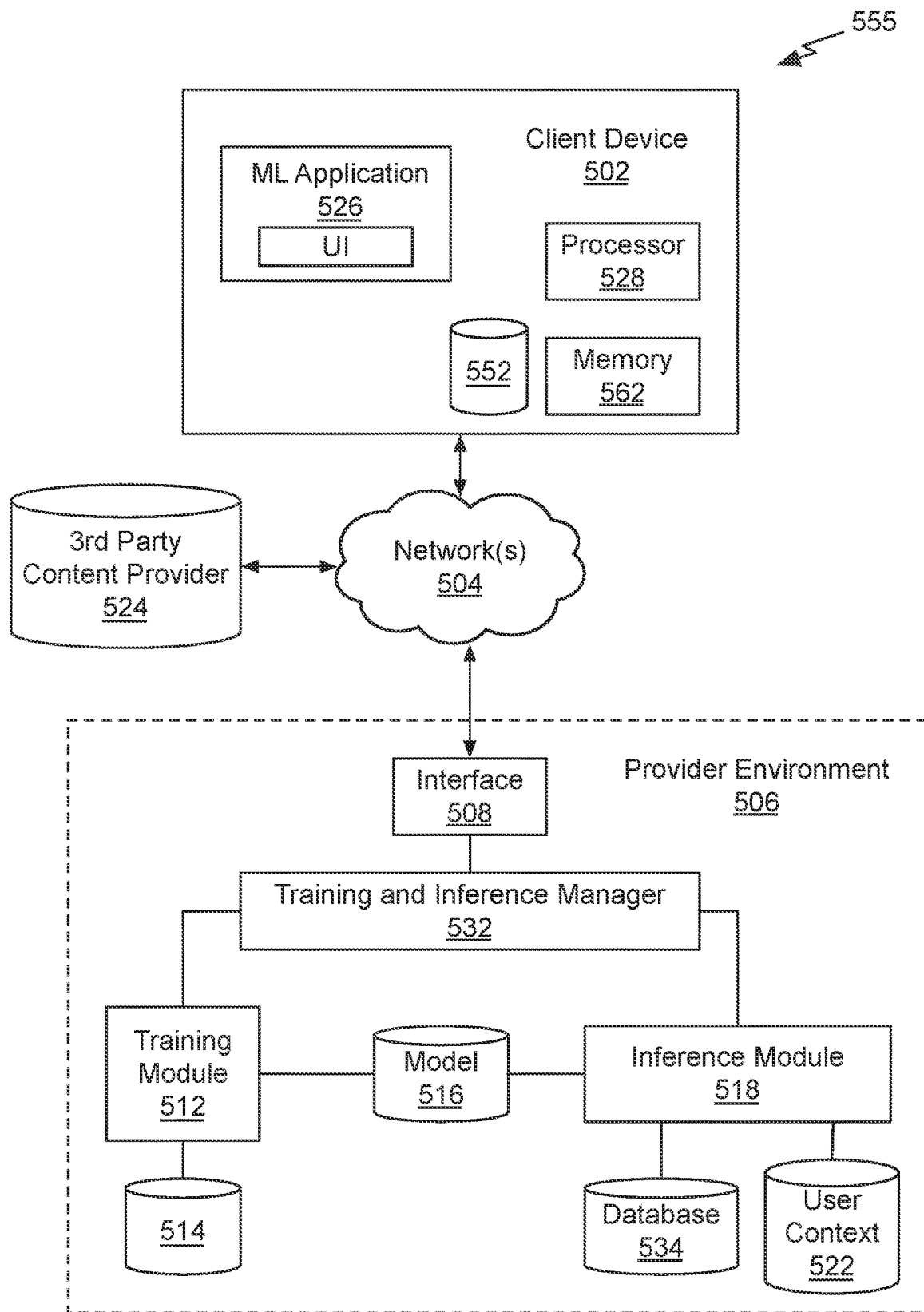
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache, the local memory 215, and/or the remote memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in the local memory 215 and/or the remote memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
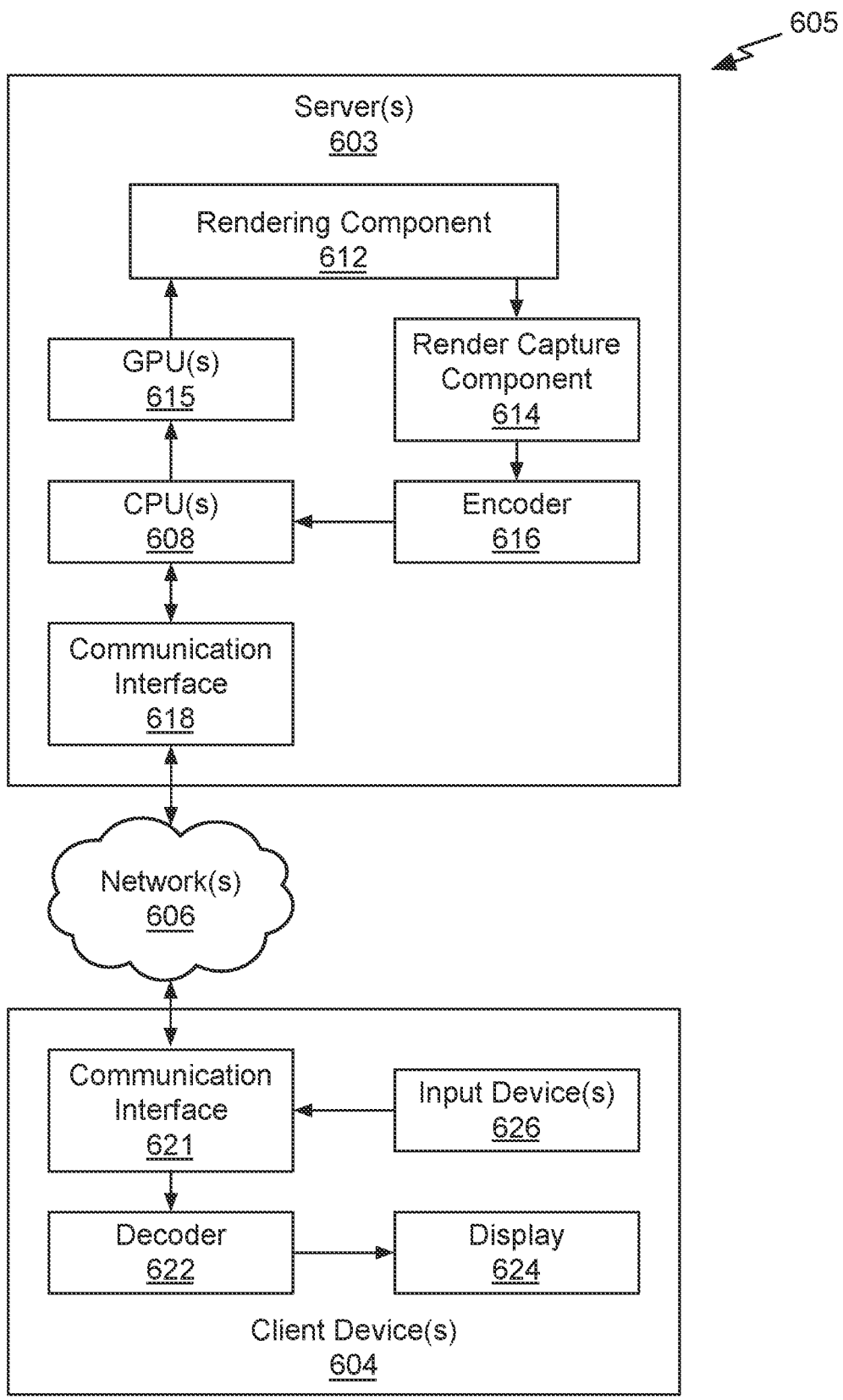
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method, comprising:
    distributing execution of a program to multiple processing units, wherein each processing unit is directly coupled to a local memory of a memory system and indirectly coupled to the local memories that are directly coupled to the remaining processing units;
    launching a first portion of the program for execution as a first thread array by a first processing unit of the processing units, wherein pages of the memory system are assigned to a set of counters;
    for accesses of the memory system during execution of the first thread array, updating the counter associated with the page specified by the access; and
    in response to completion of execution of the first thread array, reading at least a portion of the set of counters to produce a memory access profile for the first thread array.

2. The method of claim 1, wherein the distributing comprises:
    partitioning the program into the first thread array associated with first memory pages of the memory system and additional thread arrays associated with additional memory pages of the memory system; and
    mapping each partition to a corresponding processing unit.

3. The method of claim 1, each local memory comprises a memory stack that is aligned with the corresponding processing unit in either a vertical or horizontal direction.

4. The method of claim 1, wherein the memory access profile is produced by applying a bloom filter to the set of counters.

5. The method of claim 1, further comprising initializing the set of counters during the reading.

6. The method of claim 1, wherein a first virtual memory page is swapped out of the memory system for a second virtual memory page during execution of the program, and further comprising updating the memory access profile with each counter in the set of counters assigned to the first virtual memory page for the first thread array that has a non-zero counter value.

7. The method of claim 1, wherein a first virtual memory page is swapped out of the memory system for a second virtual memory page during execution of the program, and further comprising discarding counter values of each counter in the set of counters assigned to the first virtual memory page.

8. The method of claim 1, wherein the counter for a first page tracks read accesses separately from write accesses.

9. The method of claim 1, wherein the counter for a first page tracks accesses resulting in a cache miss.

10. The method of claim 1, wherein the counter for a first page tracks accesses to a cache line fetched in response to an access of the memory system by a second thread array.

11. The method of claim 1, wherein bandwidth between each processing unit and the local memory that is directly coupled to the remaining processing units decreases as a distance between the processing unit and the remaining processing units increases.

12. The method of claim 1, wherein energy consumed by each processing unit accessing the local memory that is directly coupled to the remaining processing units increases as a distance between the processing unit and the remaining processing units increases.

13. The method of claim 1, further comprising repeating the distributing based on the memory access profile to reduce non-local memory accesses.

14. The method of claim 1, further comprising identifying a memory page that is accessed by two or more of the multiple processing units and distributing the memory page across the local memories of the two or more of the multiple processing units.

15. A system, comprising:
a memory system; and
a processor comprising multiple processing units, wherein the processor is configured to produce a memory access profile by:
distributing execution of a program to the multiple processing units, wherein each processing unit is directly coupled to a local memory of the memory system and indirectly coupled to the local memories that are directly coupled to the remaining processing units;
launching a first portion of the program for execution as a first thread array by a first processing unit of the processing units, wherein pages of the memory system are assigned to a set of counters;
for accesses of the memory system during execution of the first thread array, updating the counter associated with the page specified by the access; and
in response to completion of execution of the first thread array, reading at least a portion of the set of counters to produce the memory access profile for the first thread array.

16. The system of claim 15, wherein the set of counters is initialized as the set of counters is read.

17. The system of claim 15, wherein the processor is included in a server or in a data center to generate data that is streamed to a user device.

18. The system of claim 15, wherein the processor is included within a cloud computing environment.

19. The system of claim 15, wherein the program is executed for training, testing, or certifying a neural network employed in a machine, robot, or autonomous vehicle.

20. The system of claim 15, wherein the multiple processing units are included in a virtual machine comprising a portion of a graphics processing unit.

* * * * *